United States Patent
Maeng et al.

(10) Patent No.: US 11,262,065 B2
(45) Date of Patent: Mar. 1, 2022

(54) SYSTEM AND METHOD FOR OPTIMIZING COMBUSTION OF BOILER

(71) Applicant: DOOSAN HEAVY INDUSTRIES & CONSTRUCTION CO., LTD., Changwon-si (KR)

(72) Inventors: Jwa Young Maeng, Yongin-si (KR); Sang Gun Na, Yongin-si (KR)

(73) Assignee: Doosan Heavy Industries Construction Co., Ltd, Changwon-si (KR)

( * ) Notice: Subject to any disclaimer, the term of this patent is extended or adjusted under 35 U.S.C. 154(b) by 43 days.

(21) Appl. No.: 16/562,427

(22) Filed: Sep. 5, 2019

(65) Prior Publication Data

US 2020/0173649 A1    Jun. 4, 2020

(30) Foreign Application Priority Data

Nov. 30, 2018 (KR) .................. 10-2018-0152751

(51) Int. Cl.
*F22B 35/18* (2006.01)
*G05B 13/04* (2006.01)

(52) U.S. Cl.
CPC ............ *F22B 35/18* (2013.01); *G05B 13/042* (2013.01)

(58) Field of Classification Search
CPC ..... G05B 17/02; G05B 13/042; G05B 13/048
See application file for complete search history.

(56) References Cited

U.S. PATENT DOCUMENTS

| | | | | |
|---|---|---|---|---|
| 7,117,046 | B2 * | 10/2006 | Boyden | ................ G05B 13/026 700/52 |
| 8,527,072 | B2 * | 9/2013 | Piche | ........................ H02J 3/38 700/36 |
| 8,755,916 | B2 | 6/2014 | Lou | |
| 2009/0132095 | A1 * | 5/2009 | Sekai | .................. G05B 13/027 700/286 |

(Continued)

FOREIGN PATENT DOCUMENTS

| CN | 105444201 A | * | 3/2016 | ........... G05B 13/041 |
|---|---|---|---|---|
| CN | 106610651 A | * | 5/2017 | |

(Continued)

OTHER PUBLICATIONS

Jung Hae Won, system for controlling optimized combustion on boiler, 2016, google patents, pp. 1-8 (Year: 2016).*

(Continued)

*Primary Examiner* — Darrin D Dunn
*Assistant Examiner* — Yvonne Trang Follansbee
(74) *Attorney, Agent, or Firm* — Invenstone Patent, LLC (57) ABSTRACT

A system for controlling a boiler apparatus in a power plant to combust under optimized conditions, and a method for optimizing combustion of the boiler apparatus using the same are provided. The boiler control system may include a modeler configured to create a boiler combustion model, an optimizer configured to receive the boiler combustion model from the modeler and perform the combustion optimization operation for the boiler using the boiler combustion model to calculate an optimum control value, and an output controller configured to receive the optimum control value from the optimizer, and control an operation of the boiler by reflecting the optimum control value to a boiler control logic.

20 Claims, 4 Drawing Sheets

(56) References Cited

U.S. PATENT DOCUMENTS

| | | | |
|---|---|---|---|
| 2010/0049561 A1 | 2/2010 | Lou et al. | |
| 2010/0319592 A1* | 12/2010 | Dohalick | F23K 3/02 |
| | | | 110/186 |
| 2013/0018831 A1* | 1/2013 | James | F22B 37/56 |
| | | | 706/23 |
| 2016/0091203 A1* | 3/2016 | Wang | F23N 1/022 |
| | | | 700/274 |
| 2016/0109895 A1* | 4/2016 | Schindler | G05F 1/66 |
| | | | 700/291 |

FOREIGN PATENT DOCUMENTS

| | | | | |
|---|---|---|---|---|
| EP | 1921280 B1 * | 8/2019 | | F01K 13/02 |
| JP | 2009068798 A | 4/2009 | | |
| JP | 2009198136 A | 9/2009 | | |
| JP | 2013178045 A | 9/2013 | | |
| KR | 100560114 B1 | 3/2006 | | |
| KR | 101041467 B1 | 6/2011 | | |
| KR | 101484496 B1 | 1/2015 | | |
| KR | 20160104481 A * | 9/2016 | | |
| KR | 101810968 B1 | 12/2017 | | |
| WO | WO-2019208773 A1 * | 10/2019 | | G05B 19/418 |
| WO | WO-2020105629 A1 * | 5/2020 | | F02C 6/00 |

OTHER PUBLICATIONS

Chen Yao, Combustion optimization method and system thereof, 2016, google patents, pp. 1-6 (Year: 2016).*

Widmer neil colin, systems and methods for multi-level optimizing control systems for boilers, 2013, pp. 1-11 (Year: 2013).*

Hu Chenghua, Hybrid genetic algorithm for solving multi-objective flexible job-shop scheduling problem, 2015, pp. 1-6 (Year: 2015).*

Jun, Pulverized coal drying system for coal pulverizer and pulverized coal drying method therefor, and pulverized coal drying program, coal pulverizer, and gasification combined cycle facility, 2020, google patents, translation of WO2020105629A1 (Year: 2020).*

Yoshida, Operation assistance device for plant, operation assistance method for plant, learning model creation method for plant, operation assistance program for plant . . . , 2019, google patents, translation of WO2019208773A1 (Year: 2019).*

* cited by examiner

SYSTEM AND METHOD FOR OPTIMIZING COMBUSTION OF BOILER

CROSS REFERENCE TO RELATED APPLICATION

This application claims priority to Korean Patent Application No. 10-2018-0152751, filed on Nov. 30, 2018, the entire disclosure of which is incorporated herein by reference in its entirety.

BACKGROUND

1. Field

Apparatuses and methods consistent with exemplary embodiments relate to a system for controlling a boiler apparatus in a power plant to ensure combust under optimized conditions, and a method for optimizing combustion of the boiler apparatus using the same and, more particularly to a system and method for calculating an optimum control value or a set point for optimizing combustion of a boiler.

2. Description of the Related Art

A thermal power plant has a boiler therein to heat water by using an exothermic reaction generated when burning fuel such as coal or the like, thereby producing steam for driving a turbine. When a combustion occurs in the boiler, emissions such as nitrogen oxides and carbon dioxide are generated. In recent years, the combustion environment is controlled to generate less emission because an operation of the power plant requires considerable cost to manage such emissions, and efforts are being made to increase the combustion efficiency of boilers.

In a related art thermal power plant, a boiler control, that is, a combustion control, has been performed, by a skilled expert by adjusting combustion environment parameters of a boiler with reference to performance test data during a trial run, and then starting a boiler operation. In addition, after the boiler operation has been started, the combustion control is performed by fine-tuning an offset value. Therefore, according to the related art boiler operating method, because it is not easy to control the boiler in an optimum combustion state when the boiler is operating, stable combustion control for the stability of the boiler has been given more priority than the optimum control thereof. There has been a problem in the related art that the optimum combustion environment of a boiler could not be properly implemented.

In order to solve the problem, studies have been made to optimize combustion control of a boiler by automatically acquiring and analyzing operating data of the boiler in real time and automatically adjusting various control variables of the boiler according to the analyzed result.

SUMMARY

Aspects of one or more exemplary embodiments provide a system and method for controlling a boiler in a power plant to calculate an optimum set point for a control object in the boiler to maximize the combustion efficiency of the boiler while minimizing the generation of emissions including nitrogen oxides and carbon oxides.

Aspects of one or more exemplary embodiments provide a method for controlling the combustion environment of a boiler in a power plant by applying an artificial intelligence algorithm for boiler combustion control so that a most suitable model for boiler combustion is generated through self-learning and modeling to calculate an optimum set point required for controlling the combustion environment with reference to the generated model.

Additional aspects will be set forth in part in the description which follows and, in part, will become apparent from the description, or may be learned by practice of the exemplary embodiments.

According to an aspect of an exemplary embodiment, there is provided a system for a combustion optimization operation for a boiler, the system including: a modeler configured to create a boiler combustion model; an optimizer configured to receive the boiler combustion model from the modeler and perform the combustion optimization operation for the boiler using the boiler combustion model to calculate an optimum control value; and an output controller configured to receive the optimum control value from the optimizer, and control an operation of the boiler by reflecting the optimum control value to a boiler control logic.

The optimizer may perform the combustion optimization operation using a combustion optimization algorithm.

The optimizer may calculate a set point for at least one control object in the boiler by performing the combustion optimization operation, the combustion optimization operation using different logics depending on a purpose received from a user.

The purpose may include one of a cost optimization considering a cost as a top priority, an emission optimization considering an emission reduction as a top priority, and an equipment protection optimization considering an equipment protection as a top priority.

The combustion optimization operation may be performed according to a following objective function f, $$f = C_{obj1} * (\text{Factor 1}) + C_{obj2} * (\text{Factor 2}) + C_{obj3} * (\text{Factor 3}),$$

where C is a weighted value for the purpose, and Factor is an equation for calculating a value for the purpose.

If the purpose is selected by the user, among a plurality of weighted values included in the objective function, a weighted value corresponding to the selected purpose may be set to a value greater than weighted values corresponding to the other purposes not selected by the user.

The weighted values corresponding to the purposes not selected by the user may be greater than zero.

The optimizer may be configured to collect at least one of operation data or state data of the boiler that is in operation, and determine whether to perform the combustion optimization operation for the boiler based on the at least one of operation data or state data.

The operation data may include at least one of a power generation output, a command value or an instantaneous value, and wherein the state data may include at least one of a fluctuation in a boiler output, a fuel fluctuation, a temperature or pressure in each component of the boiler.

The optimizer may determine whether to perform the combustion optimization operation for the boiler using at least one of an analysis method based on boiler operation data, an analysis method based on a state binary value, or an analysis method based on previously recorded and stored data from knowledge and experience of operators.

According to an aspect of another exemplary embodiment, there is provided a method for performing a combustion optimization operation on a boiler, the method including: creating a boiler combustion model; performing the combustion optimization operation using the created boiler combustion model to calculate an optimum control value; and controlling an operation of the boiler by reflecting the optimum control value to a boiler control logic.

The performing the combustion optimization operation may include calculating a set point for at least one control object in the boiler, the combustion optimization operation using different logics depending on a purpose received from a user.

The purpose may include one of a cost optimization considering a cost as a top priority, an emission optimization considering an emission reduction as a top priority, and an equipment protection optimization considering an equipment protection as a top priority.

The combustion optimization operation may be performed according to a following objective function f, $$f = C_{obj1} * (\text{Factor 1}) + C_{obj2} * (\text{Factor 2}) + C_{obj3} * (\text{Factor 3}),$$

where C is a weighted value for the purpose, and Factor is an equation for calculating a value for the purpose.

If the purpose is selected by the user, among a plurality of weighted values included in the objective function, a weighted value corresponding to the selected purpose may be set to a value greater than weighted values corresponding to the other purposes not selected by the user.

The weighted values corresponding to the purposes not selected by the user may be greater than zero.

The method may further include: collecting at least one of operation data or state data of the boiler that is in operation; and determining whether to perform the combustion optimization operation for the boiler based on the at least one of operation data or state data.

The operation data may include at least one of a power generation output, a command value or an instantaneous value, and wherein the state data may include at least one of a fluctuation in a boiler output, a fuel fluctuation, a temperature or pressure in each component of the boiler.

According to an aspect of another exemplary embodiment, there is provided a non-transitory computer-readable storage medium storing instructions of executing a method of optimizing a combustion optimization operation on a boiler, the method including: creating a boiler combustion model; performing the combustion optimization operation using the created boiler combustion model to calculate an optimum control value; and controlling an operation of the boiler by reflecting the optimum control value to a boiler control logic.

According to one or more exemplary embodiments, the combustion efficiency of the boiler in a power plant can be improved and the emissions causing environmental pollution can also be minimized, whereby the cost of treating the emissions can be significantly reduced, thereby significantly reducing the operating cost of the power plant.

In addition, one or more exemplary embodiments can control the boiler in an optimized combustion state with reference to the results learned by artificial intelligence, so that even unskilled workers can realize, without difficulty, a better combustion environment compared to what is obtained by a skilled expert in the related art.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. Further, the terms "comprises", "includes", or "have/has" should be construed as designating that there are such features, regions, integers, steps, operations, elements, components, and/or a combination thereof in the specification, not to exclude the presence or possibility of adding one or more of other features, regions, integers, steps, operations, elements, components and/or combinations thereof.

In addition, terms concerning attachments, coupling and the like, such as "connected" and "coupled" refer to a relationship in which structures are secured or attached to one another either directly or indirectly through intervening structures.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 1:
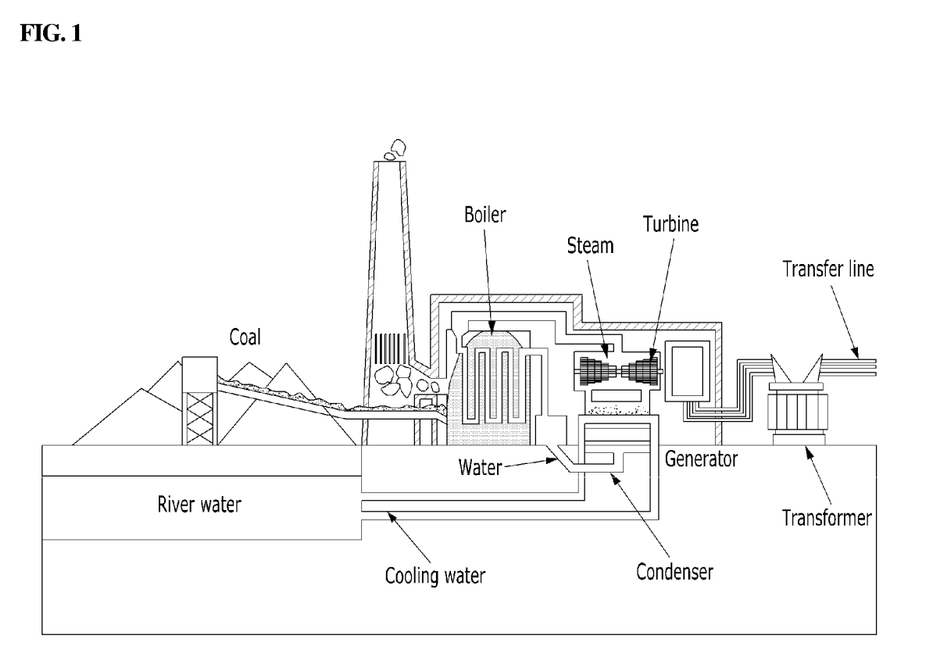
FIG. 1 is a schematic diagram illustrating a general configuration of a thermal power plant.

FIG. 1 illustrates a general configuration of a thermal power plant, in particular for illustrating a position and role of a boiler. Thermal power plants generate steam from coal or petroleum-fired power to turn steam turbines and produce electrical energy. Boiler in the thermal power plant serves to boil water by burning fuel to supply high-temperature and high-pressure steam to steam turbines. The boiler may include a boiler body containing water and steam, a combustor for combusting a fuel, and a furnace. The combustor, the furnace, and the like are controlled by a control system to control temperature, pressure, and the like.

Boiler control is a key control operation in the power plant. In the past, because the control operation of the boiler has been a very complicated process, a skilled expert is necessary for normal operation. Recently, by adopting an automated control method in operating the boiler, a system for boiler control is implemented without manual manipulation. This automated control method enables real-time control of the boiler. Further, to increase the combustion efficiency of the boiler, a control that is gradually close to real time by controlling the boiler such that a current state of the boiler is checked in every short period of time may be implemented, and respective control operations may be performed on control targets according to the current state.

The exemplary embodiment provides a boiler control system and method that can improve the combustion efficiency and reduce emission by adding, to a currently available boiler control system and method, (i) generation and update of a boiler combustion model utilizing artificial intelligence, and (ii) an optimization operation for finding an optimal set point for each control target with reference to the status of a boiler in operation.

Figure 2:
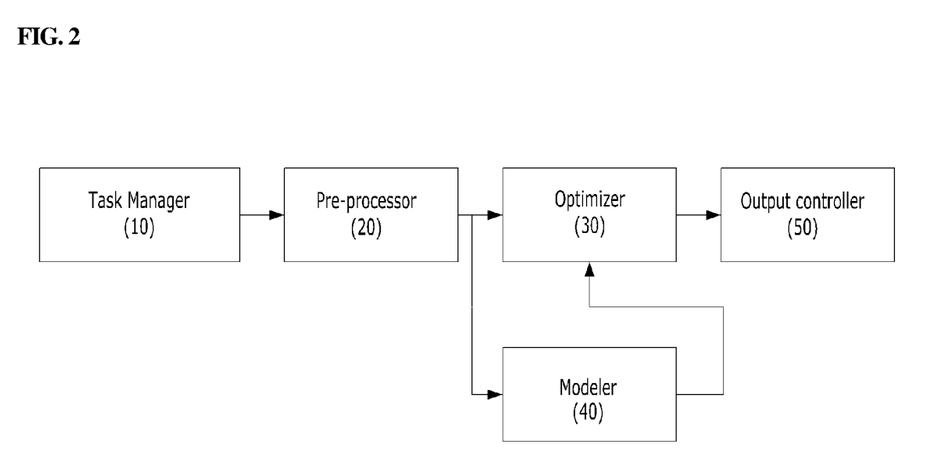
FIG. 2 is a block diagram illustrating a configuration of a boiler control system according to an exemplary embodiment.

FIG. 2 illustrates a block diagram of a boiler control system according to an exemplary embodiment. Referring to FIG. 2, the boiler control system includes a task manager 10, a pre-processor 20, an optimizer 30, a modeler 40, and an output controller 50. Although the boiler control system of FIG. 2 includes configuration blocks designated by functions or steps to be performed, it will be appreciated that the boiler control system may be implemented as a device, including a CPU for operation and a memory that can store program and data for operation, and that the above configurations of the boiler control system may be implemented on a program designed in a computer-readable language, and executed by the CPU. Further, the boiler control system may be implemented by hardware or firmware, software, or a combination thereof. When implemented using hardware, the boiler control system may include an application specific integrated circuit (ASIC), or a digital signal processor (DSP), a digital signal processing device (DSPD), a programmable logic device (PLD), a field programmable gate array (FPGA), and the like. When implemented using firmware or software, the boiler control system may include a module, procedure, or function that performs the above functions or operations.

The task manager 10 is configured to check a current operating state of the boiler and determine whether to perform a boiler combustion optimization. For example, the task manager 10 may collect operation data and state data (e.g., state binary value) of the boiler that is in operation, and determine whether the boiler combustion optimization is possible (i.e., whether to perform the boiler combustion optimization) based on the collected data. The operation data of the boiler includes measurements received from various sensors installed in the currently operating boiler, or control values that can be monitored by the boiler control system. Examples of the operation data may include power output (MW), commands, and the like. The state data includes values that indicate fluctuations in boiler output, fuel fluctuations, temperature and pressure in each component, and so on.

The task manager 10 determines whether combustion optimization is necessary or possible based on the collected operation data and state data. In this determination process, integrity of the boiler system (e.g., the operating state of the hardware, the system resource status, communication environment, etc.), and integrity of respective modules in the boiler system (e.g., the operating state of software, the existence of the boiler combustion model, etc.) are considered. For example, the task manager 10 may determine that the power plant is not stabilized in a section in which the power output changes drastically. For example, when the power output (e.g., 500 MW) changes tens of megawatts (e.g., 50 MW) over a reference value for 30 minutes, the task manager 10 may determine that it is an unstable state and may not proceed with the combustion optimization.

There are three analysis methods to determine whether the combustion optimization is necessary or possible. The analysis methods include an analysis method based on boiler operation data, an analysis method based on a state binary value, and an analysis method based on previously recorded and stored expert's knowledge and experience. These analysis methods may be used unitarily or in combination by the task manager 10 to determine whether to perform the combustion optimization. The analysis method based on the expert's knowledge and experience, which are recorded and stored in advance, is configured such that the analysis is performed based on previously stored data including operating states of a boiler and corresponding manipulations by an expert who operates the boiler. For example, expert's manipulation such as a supply B of fuel to a combustion chamber of a boiler if the temperature in the combustion chamber is A, and expert's manipulation such as an adjustment of a damper angle to D if the temperature in the combustion chamber is C may be stored and will be referred to later for analysis.

The pre-Processor 20 is configured to pre-filter only data suitable for modeling, that is, data suitable for learning by the modeler 40. While a quantity of input data that can be collected from the boiler and output data according to the input data is very greater, some data include some error values that are unmatched or less correlated, which reduces the accuracy of modeling. The pre-processor 20 may be a configuration required to further improve the accuracy when generating a model in the modeler 40 by filtering such unnecessary data in advance.

The pre-processor 20 performs signal restoration, filtering, and outlier processing functions. The signal restoration function is configured to restore signals collected from the boiler when there is some loss in the signals, or to restore the corresponding signal when the boiler has an abnormality or failure. The filtering function is configured to filter out, among the restored signals, data outside a normal data range or remove signal noise, and to further extract only data to be used for modeling, optimization operation, and output control, using a known knowledge-based logic. The outlier processing function is configured to process out-of-trend data, using a data-based logic.

The pre-processor 20 may be implemented to further perform a tag clustering function and a data sampling function according to a designer's intention or a user's need. Here, the tag clustering function serves to construct one data group by deleting unnecessary tag information and extracting only relevant tag information, among tags corresponding to respective control targets of a boiler. The data sampling function serves to operate data patterns and sample data according to a sampling algorithm to output learning data required for modeling.

As described above, the pre-processor 20 serves to collect data associated with the operation of the boiler and process the data into a form suitable for future modeling.

The optimizer 30 is a configuration that calculates an input for creating an optimum combustion state using a boiler combustion model that is to be generated by the modeler 40. The optimizer 30 performs a function of receiving an optimization purpose selection from a user, a function of receiving a boiler combustion model from the modeler 40, and a function of performing a boiler combustion optimization using the boiler combustion model.

The function of receiving the optimization purpose selection from a user, i.e. an operator of the boiler control system, can first select a purpose to carry out the combustion optimization prior to executing the combustion optimization. The optimizer 30 may receive the user's selection by providing an interface to select a plurality of purposes. The plurality of purposes may include, for example, a cost optimization considering a cost as a top priority, an emission optimization considering an emission reduction as a top priority, and a device protection optimization considering a device protection as a top priority. It is understood that this is merely one example, and other purposes for optimization may be included. The optimizer 30 performs an optimization operation by applying different logics according to the user's selection of purposes received from the user.

Regarding the function of receiving the boiler combustion model from the modeler 40, the optimizer 30 requires a boiler combustion model to perform the optimization operation, in which the boiler combustion model may be composed of a combination of mathematical models including an artificial neural network, which may be generated through repeated learning by the modeler 40.

Regarding the function of performing the boiler combustion optimization operation, the optimizer 30 calculates an optimal input value as a final output value by executing a simulation with application of the user's purpose selection and the boiler combustion model. The algorithms or controllers used in this case may include Proportional-Integral-Derivative (PID) algorithms, Degree of Freedom (DOF) algorithms, Model Predictive Control (MPC) algorithms, Adaptive algorithms, Fuzzy algorithms, H-infinity algorithms, Linear Parameter Varying (LPV) Model-based algorithms, Particle Swarm Optimization algorithms, Genetic Algorithm (GA), etc.

As described above, the optimizer 30 performs an optimization operation according to the user's purpose selection and the boiler combustion model received from the modeler 40 to calculate the optimal input value required for boiler combustion control.

The modeler 40 generates a boiler combustion model that can be utilized in the optimizer 30. According to the exemplary embodiment, it is characterized in that the modeler 40 generates the boiler combustion model using an artificial neural network.

The artificial neural network is a data processing methodology that simulates an inductive learning ability by mathematically modeling an information processing structure of a brain composed of neurons. This data processing methodology has a main purpose of patterning correlation between input and output values, and predicting an output value from a new input value based on the derived pattern. The artificial neural network consists of parallel connection structures (layers) of nodes that play the role of neurons. Generally, the neural network has a serial connection of input layer-hidden layer-output layer. Alternatively, the neural network may be implemented to have a plurality of hidden layers to process the complicated correlation between input and output values. When using the artificial neural network, even if physical characteristics or correlation are not clearly known, it is possible to obtain learning of correlation only with input and output values, prediction of multiple outputs, and deriving of the correlation between input and output values without linear extrapolation for non-linear behavior.

The modeler 40 may receive an input value and an output value related to boiler combustion from the pre-processor 20. Examples of the input data may include damper angles of a primary air and a secondary air, a damper angle of a combustion air nozzle (OFA), an amount of coal fed from a coal feeder, an ambient temperature, etc. Examples of the output data may include a boiler output, temperature and pressure of a combustion gas in the boiler, an amount of nitrogen oxides, carbon monoxide, and oxygen in the combustion gas, a spray flow rate of a reheater, and the like.

As described above, the modeler 40 generates a boiler combustion model similar to the actual operating state of the boiler by using an artificial neural network, and the generated boiler combustion model is provided to the optimizer 30.

The output controller 50 is configured to perform the combustion control of the boiler. The output controller 50 includes a function of checking a current operating state of the boiler prior to controlling the boiler, and a function of reflecting the optimum control value calculated by the optimizer 30 by applying the optimum control value to the existing boiler control logic.

Regarding the function of checking the operating state of the boiler, the output controller 50 needs to check the current operating state of the boiler prior to actually controlling the boiler. This is because even if the optimum control value calculated by the optimizer 30 is immediately reflected in the boiler operating state, the boiler may be in an unstable state or an error may occur, so the optimum control value should be appropriately divided and reflected according to the current operating state of the boiler.

The output controller 50 may maximize actual combustion efficiency of the boiler by inputting the optimum control value previously calculated by the optimizer 30 to the boiler that is in operation. Here, the output controller 50 performs Dynamic Bias Tracking on the calculated optimum control value, thereby reflecting the optimum control value in real time to the existing combustion logic of the boiler. For example, assuming that the optimum control value is a temperature value T100 in a combustion chamber of the boiler, if the current temperature in the combustion chamber is T1, the output controller 50 should perform a control operation to elevate the temperature from T1 to T100. Here, a sudden change in temperature may cause problems, so the temperature should be controlled in stages. In this case, the output controller 50 may change the temperature in stages while dividing a temperature range (to T100) to be changed into a plurality of continuous stage sub-ranges. For example, the output controller 50 may control the temperature to gradually elevate from T1 to T20 in a first stage time period, from T20 to T40 in a second stage time period, from T40 to T60 in a third stage time period, from T60 to T80 in a fourth stage time period, and from T80 to T100 in a final fifth stage time period. This time period is shorter than a time period in which the optimum control value is calculated by the optimizer 30. For example, assuming that the optimizer 30 calculates the optimum control value every 5 minutes, the output controller 50 may execute an operation control of the boiler every 10 seconds. That is, performing the operation control of the boiler in every short time periods is defined as dynamic bias tracking, which is provided for checking the operating state of the boiler in real time and at the same time, stably reflecting the optimum control value without a sudden change in the operation of the boiler.

Figure 3:
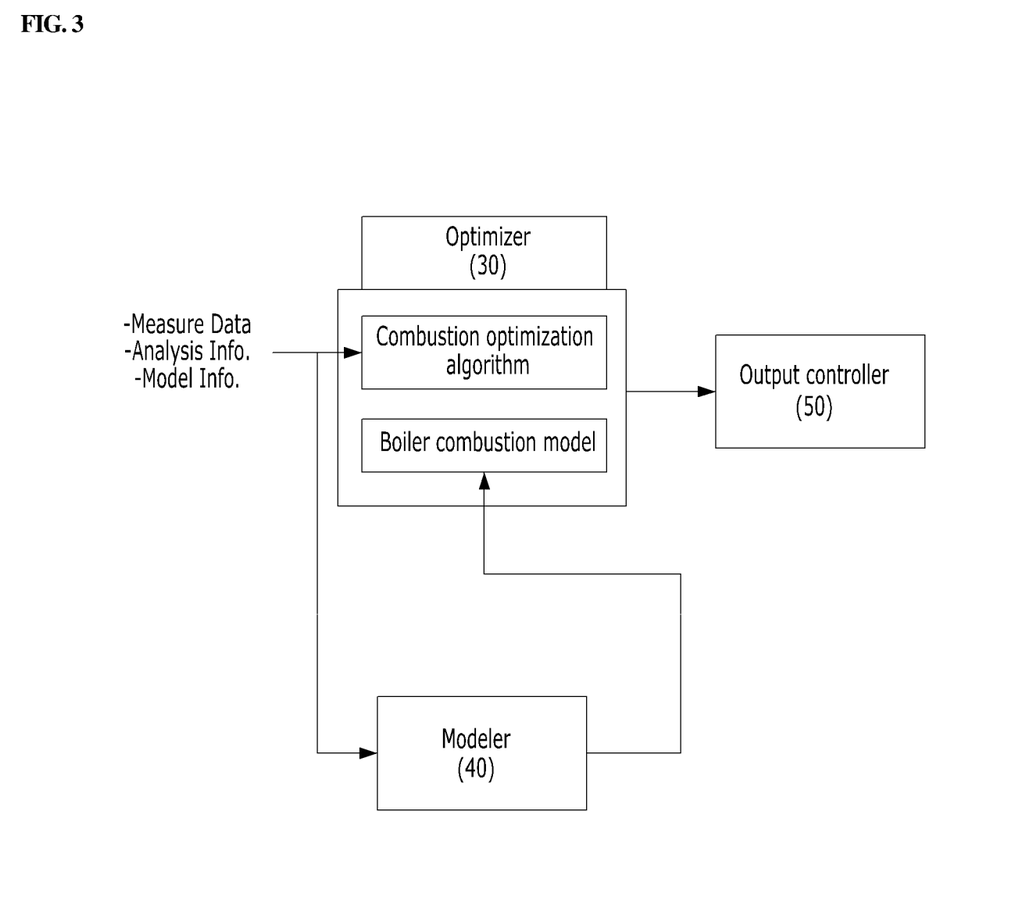
FIG. 3 is a view illustrating a function of an optimizer in the boiler control system according to an exemplary embodiment.

FIG. 3 illustrates a function of the optimizer 30 in the boiler control system according to an exemplary embodiment. Referring to FIG. 3, the optimizer 30 obtains an optimum control value through a boiler combustion model and a combustion optimization algorithm. It is understood that the combustion optimization algorithm may be a set of procedures, methods and instructions for combustion optimization, and may be replaced by another term, such as combustion optimization technology, combustion optimization control (controller), or the like.

Here, the boiler combustion model is generated by the modeler 40 based on the results learned through the artificial neural network.

Although the combustion optimization algorithm may have various kinds of algorithms, it may be a control using a particle swarm optimization technology in other exemplary embodiment. However, it will be appreciated that the system does not necessarily use the particle swarm optimization algorithm as a combustion optimization algorithm, and other kinds of algorithms, such as PID, DOF, MPC, or the like, may also be used as the combustion optimization algorithm.

The particle swarm optimization techniques are classified as Swarm Intelligence Techniques, which are stochastic global optimization techniques that are developed through inspiration from the social behavior of animals such as fishes or birds. The particle swarm optimization algorithm copies the way for a large number of entities, called particles, to find an optimum solution within a given search area based on information of each particle and of a group of particles as a whole. The particle swarm optimization algorithm is easy to implement because it can perform a search only by four arithmetic operations, compared to other heuristic optimization techniques. Especially, it is easy to analyze natural phenomenon that cannot be differentiated, because it does not use gradient information.

It is understood that the optimizer 30 inputs a plurality of control variables to a single boiler combustion model, and repeatedly performs a process of converging the control variables as a single particle to an optimum control value using the particle swarm optimization algorithm.

Figure 4:
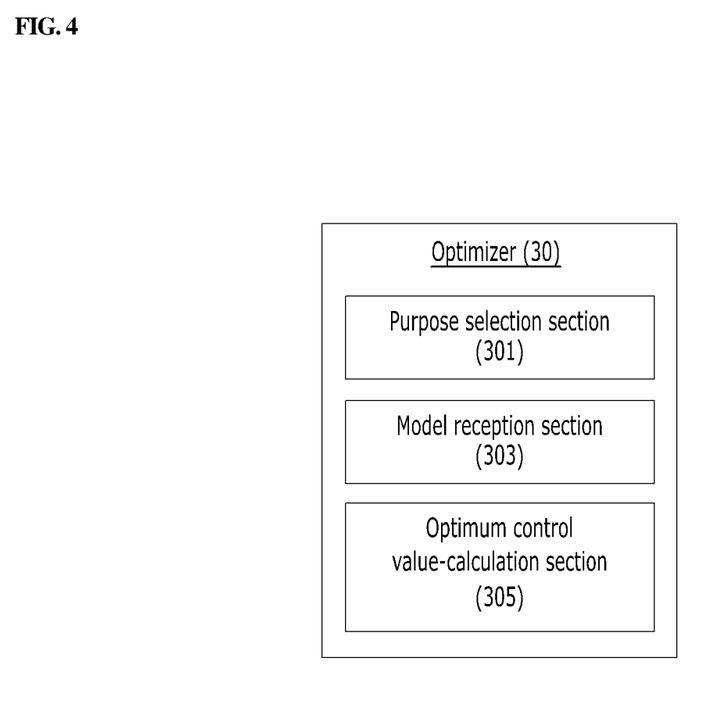
FIG. 4 illustrates the optimizer according to an exemplary embodiment.

FIG. 4 illustrates the optimizer 30 in further detail according to an exemplary embodiment. Referring to FIG. 4, the optimizer 30 includes a purpose selection section 301, a model reception section 303, and an optimum control value-calculation section 305. It will be appreciated that the purpose selection section 301, the model reception section 303, and the optimum control value-calculation section 305 may be implemented by a CPU executing computer-readable codes stored in memory.

The purpose selection section 301 may provide a list of a plurality of purposes through an interface to a user, i.e., a user who operates a boiler, to allow the user to select the purpose for which an optimization operation is to be performed. If a specific purpose is selected by the user, the purpose selection section 301 may receive the selected purpose. The optimizer 30 serves to calculate a control value through the optimum control value-calculation section 305. In this case, the optimum control value-calculation section 305 performs an operation using a different logic according to the purpose selected by the user.

The purpose selection section 301 may provide a user with a list of at least 3 purposes including a cost optimization (i.e., Profit Max) considering a cost as a top priority, an emission optimization (i.e., Emission Min) considering an emission reduction as a top priority, and an equipment protection optimization (i.e., Equipment Durability) considering an equipment protection as a top priority and receive an input for selecting any one of the purposes from the user.

The model reception section 303 receives a boiler combustion model created by the modeler 40. The model reception section 303 may receive the boiler combustion model in a preset period cycle, or irrespective of a period cycle. The modeler 40 may continuously create new boiler combustion models, and after accumulating multiple boiler combustion models, select, among the boiler combustion models, a boiler combustion model showing a same operation state as a current operation state of a boiler, or an operation state that is most similar to the current operation state of the boiler. The model reception section 303 may then receive the selected boiler combustion model from the modeler 40.

The optimum control value-calculation section 305 calculates an optimum control value (i.e., a set point) for at least one control object in a boiler, based on the purpose selected by the user and the boiler combustion model provided by the modeler 40.

The optimum control value-calculation section 305 uses different logics according to the purposes selected by the user. For example, if the Profit Max is selected, the logic is selected to minimize the total costs, including fuel cost and emission treatment cost, associated with improved plant efficiency. Here, the improvement of the plant efficiency may also include a reduction in both the total amount of reheater spray and the amount of oxygen in combustion gas. If the Emission Min is selected, the logic is selected to minimize the amount of nitrogen oxides (NOx) and carbon monoxide (CO) in combustion gas. If the Equipment Durability is selected, the logic is selected to minimize a variation in temperature for each space section in the boiler and a variation in injection volume of the reheater spray for each space section in the boiler.

On the other hand, even if one mode is selected by the user, the optimum control value-calculation section 305 performs an operation for the purpose corresponding to the selected mode and an operation for the other purposes that were not selected. In other words, even if the Profit Max is selected by the user, the optimum control value-calculation section 305 may perform an operation for operation variables corresponding to the selected purpose and an operation for operation variables corresponding to the other purposes, i.e. Emission Min and Equipment Durability, which were not selected, for calculating the optimum control value. This is to prevent a situation in which if an operation for calculating an optimum control value is performed only for the operation variables corresponding to any one of purposes, an operation state of a boiler is deteriorated due to other operation variables that are not considered in that operation.

It is understood that the above-described three kinds of purposes are merely examples, and various other purposes may be provided according to a designer's intention for a boiler control system.

The optimum control value-calculation section 305 may perform the calculation according to a following generalized objective function f.

$$f = C_{obj1}*(\text{Factor 1}) + C_{obj2}*(\text{Factor 2}) + C_{obj3}*(\text{Factor 3}),$$

where C means weighted values according to a specific purpose selected by a user, wherein respective weighted values may vary according to the purpose selected by the user. For example, if the user selects a first purpose, a weighted value $C_{obj1}$ will have a relatively larger value than $C_{obj2}$ or $C_{obj3}$. In addition, if the user selects a second purpose or a third purpose, a weighted value $C_{obj2}$ or $C_{obj3}$ will have a relatively larger value than the other. Factor1, Factor2, and Factor3 of the objective function f refer to equations for calculating actual values according to the respective purposes. For example, Factor1 may include an equation for calculating the cost of fuel to be supplied and an equation for calculating the cost of using a reheater spray, or the like. Factor 2 may include an equation for calculating the pollutant emissions, and Factor3 may include an equation for predicting a lifetime of various components installed in a boiler.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A system for a combustion optimization operation for a boiler, the system comprising a central processing unit (CPU) including memory, the CPU configured to execute program steps of:
    creating a boiler combustion model;
    performing the combustion optimization operation using the boiler combustion model to calculate an optimum control value for a first time period; and
    controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler,
    wherein each of the plurality of control objects of the boiler is controlled by:
        dividing a control range of a corresponding control object of the plurality of control objects of the boiler into a plurality of continuous stage sub-ranges;
        checking a current operating state of the corresponding control object prior to the controlling of the executed program steps; and
        reflecting the optimum control value in the boiler control logic existing for the current operating state,
    wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period, and
    wherein the CPU is further configured to execute program steps of:
        displaying a list of at least three optimization purposes through an interface with a worker operating the boiler, the at least three optimization purposes including cost optimization, emission optimization, and equipment protection optimization,
        receiving an input from the worker selecting any one of the at least three optimization purposes,
        continuously creating new boiler combustion models to accumulate multiple boiler combustion models in order to select, among the multiple boiler combustion models, a boiler combustion model showing an operation state that is most similar to a current operation state of the boiler, and
        calculating the optimum control value based on the selected optimization purpose and the selected boiler combustion model, the calculating including
            prioritizing the cost optimization over the emission optimization and the equipment protection optimization,
            prioritizing the emission optimization over the cost optimization and the equipment protection optimization, and
            prioritizing the equipment protection optimization over the emission optimization and the cost optimization.

2. The system according to claim 1, wherein the combustion optimization operation is performed using a combustion optimization algorithm.

3. The system according to claim 1,
    wherein the calculating includes calculating a set point for at least one control object of the plurality of control objects in the boiler by performing the combustion optimization operation, and
    wherein the combustion optimization operation uses different boiler control logics depending on the selected optimization purpose.

4. The system according to claim 1,
    wherein the cost optimization is prioritized over the emission optimization and the equipment protection optimization by minimizing total costs associated with improved plant efficiency, the total costs including fuel costs and emission treatment costs, the improved plant efficiency including a reduction in a total amount of reheater spray and a reduction in an amount of oxygen in combustion gas, wherein the emission optimization is prioritized over the cost optimization and the equipment protection optimization by minimizing an amount of nitrogen oxides (NOx) in the combustion gas and by minimizing an amount of carbon monoxide (CO) in the combustion gas, and, wherein the equipment protection optimization is prioritized over the emission optimization and the cost optimization by minimizing a variation in temperature for each of a plurality of sections of space in the boiler and by minimizing a variation in injection volume of the reheater spray for each of the plurality of sections of space in the boiler.

5. The system according to claim 3, wherein the combustion optimization operation is performed according to an objective function f, $$f=C_{obj1}*(\text{Factor 1})+C_{obj2}*(\text{Factor 2})+C_{obj3}*(\text{Factor 3}),$$

where C is a weighted value for the selected optimization purpose, and Factor is an equation for calculating a value for the selected optimization purpose.

6. The system according to claim 5,
wherein the objective function includes a plurality of weighted values, the plurality of weighted values including
a specific weighted value corresponding to the selected optimization purpose among the at least three optimization purposes and
weighted values excluding the specific weighted value and respectively corresponding to each of the other optimization purposes among the at least three optimization purposes, and
wherein the specific weighted value is set to a value greater than the weighted values excluding the specific weighted value.

7. The system according to claim 6, wherein each of the weighted values excluding the specific weighted value is greater than zero.

8. The system according to claim 1, wherein the CPU is further configured to execute a program step of:
collecting at least one of operation data or state data of the boiler to determine whether to perform the combustion optimization operation for the boiler.

9. The system according to claim 8,
wherein the operation data includes at least one of a power generation output, a command value or an instantaneous value, and
wherein the state data includes at least one of a fluctuation in a boiler output, a fuel fluctuation, a temperature or pressure in each component of the boiler.

10. The system according to claim 8, wherein whether to perform the combustion optimization operation for the boiler is determined using at least one of an analysis method based on boiler operation data, an analysis method based on a state binary value, or an analysis method based on previously recorded and stored data from knowledge and experience of operators.

11. A method for performing a combustion optimization operation on a boiler, the method comprising:
creating a boiler combustion model;
performing the combustion optimization operation using the created boiler combustion model to calculate an optimum control value for a first time period; and
controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler,
wherein each of the plurality of control objects of the boiler is controlled by:
dividing a control range of a corresponding control object of the plurality of control objects of the boiler into a plurality of continuous stage sub-ranges;
checking a current operating state of the corresponding control object prior to the controlling of the executed program steps; and
reflecting the optimum control value in the boiler control logic existing for the current operating state,
wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period, and
wherein the method further comprises:
displaying a list of at least three optimization purposes through an interface with a worker operating the boiler, the at least three optimization purposes including cost optimization, emission optimization, and equipment protection optimization,
receiving an input from the worker selecting any one of the at least three optimization purposes,
continuously creating new boiler combustion models to accumulate multiple boiler combustion models in order to select, among the multiple boiler combustion models, a boiler combustion model showing an operation state that is most similar to a current operation state of the boiler, and
calculating the optimum control value based on the selected optimization purpose and the selected boiler combustion model, the calculating including
prioritizing the cost optimization over the emission optimization and the equipment protection optimization,
prioritizing the emission optimization over the cost optimization and the equipment protection optimization, and
prioritizing the equipment protection optimization over the emission optimization and the cost optimization.

12. The method according to claim 11,
wherein the calculating includes calculating a set point for at least one control object of the plurality of control objects in the boiler, and
wherein the combustion optimization operation uses different boiler control logics depending on an optimization purpose selected by a user.

13. The method according to claim 11,
wherein the cost optimization is prioritized over the emission optimization and the equipment protection optimization by minimizing total costs associated with improved plant efficiency, the total costs including fuel costs and emission treatment costs, the improved plant efficiency including a reduction in a total amount of reheater spray and a reduction in an amount of oxygen in combustion gas, wherein the emission optimization is prioritized over the cost optimization and the equipment protection optimization by minimizing an amount of nitrogen oxides (NOx) in the combustion gas and by minimizing an amount of carbon monoxide (CO) in the combustion gas, and, wherein the equipment protection optimization is prioritized over the emission optimization and the cost optimization by minimizing a variation in temperature for each of a plurality of sections of space in the boiler and by minimizing a variation in injection volume of the reheater spray for each of the plurality of sections of space in the boiler.

14. The method according to claim 12, wherein the combustion optimization operation is performed according to an objective function f, $$f = C_{obj1}*(\text{Factor 1}) + C_{obj2}*(\text{Factor 2}) + C_{obj3}*(\text{Factor 3}),$$

where C is a weighted value for the selected optimization purpose, and Factor is an equation for calculating a value for the selected optimization purpose.

15. The method according to claim 14,
wherein the objective function includes a plurality of weighted values, the plurality of weighted values including
a specific weighted value corresponding to the selected optimization purpose among the at least three optimization purposes and
weighted values excluding the specific weighted value and respectively corresponding to each of the other optimization purposes among the at least three optimization purposes, and
wherein the specific weighted value is set to a value greater than the weighted values excluding the specific weighted value.

16. The method according to claim 15, wherein each of the weighted values excluding the specific weighted value is greater than zero.

17. The method according to claim 11, further comprising:
collecting at least one of operation data or state data of the boiler to determine whether to perform the combustion optimization operation for the boiler.

18. The method according to claim 17,
wherein the operation data includes at least one of a power generation output, a command value or an instantaneous value, and
wherein the state data includes at least one of a fluctuation in a boiler output, a fuel fluctuation, a temperature or pressure in each component of the boiler.

19. A non-transitory computer-readable storage medium storing instructions of executing a method of optimizing a combustion optimization operation on a boiler, the method comprising:
creating a boiler combustion model;
performing the combustion optimization operation using the created boiler combustion model to calculate an optimum control value for a first time period; and
controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler, wherein each of the plurality of control objects of the boiler is controlled by:
dividing a control range of a corresponding control object of the plurality of control objects of the boiler into a plurality of continuous stage sub-ranges;
checking a current operating state of the corresponding control object prior to the controlling of the executed program steps; and
reflecting the optimum control value in the boiler control logic existing for the current operating state,
wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period, and
wherein the method further comprises:
displaying a list of at least three optimization purposes through an interface with a worker operating the boiler, the at least three optimization purposes including cost optimization, emission optimization, and equipment protection optimization,
receiving an input from the worker selecting any one of the at least three optimization purposes,
continuously creating new boiler combustion models to accumulate multiple boiler combustion models in order to select, among the multiple boiler combustion models, a boiler combustion model showing an operation state that is most similar to a current operation state of the boiler, and
calculating the optimum control value based on the selected optimization purpose and the selected boiler combustion model, the calculating including
prioritizing the cost optimization over the emission optimization and the equipment protection optimization,
prioritizing the emission optimization over the cost optimization and the equipment protection optimization, and
prioritizing the equipment protection optimization over the emission optimization and the cost optimization.

20. The non-transitory computer-readable storage medium according to claim 19,
wherein the cost optimization is prioritized over the emission optimization and the equipment protection optimization by minimizing total costs associated with improved plant efficiency, the total costs including fuel costs and emission treatment costs, the improved plant efficiency including a reduction in a total amount of reheater spray and a reduction in an amount of oxygen in combustion gas,
wherein the emission optimization is prioritized over the cost optimization and the equipment protection optimization by minimizing an amount of nitrogen oxides (NOx) in the combustion gas and by minimizing an amount of carbon monoxide (CO) in the combustion gas, and,
wherein the equipment protection optimization is prioritized over the emission optimization and the cost optimization by minimizing a variation in temperature for each of a plurality of sections of space in the boiler and by minimizing a variation in injection volume of the reheater spray for each of the plurality of sections of space in the boiler.

* * * * *